United States Patent [19]
Clausen et al.

[11] 4,021,667
[45] *May 3, 1977

[54] HIGH SPEED PULSE PROCESSING

[75] Inventors: Kermit D. Clausen, Houston; John R. Rhodes, Austin, both of Tex.

[73] Assignee: Columbia Scientific Industries Corporation, Austin, Tex.

[ * ] Notice: The portion of the term of this patent subsequent to Sept. 23, 1992, has been disclaimed.

[22] Filed: July 3, 1975

[21] Appl. No.: 592,756

Related U.S. Application Data

[63] Continuation-in-part of Ser. No. 386,100, Aug. 6, 1973, Pat. No. 3,928,766.

[52] U.S. Cl. .............................. 250/273; 250/272
[51] Int. Cl.$^2$ ........................................ G21K 1/00
[58] Field of Search ................ 250/272, 273, 307; 235/151.35

[56] References Cited

UNITED STATES PATENTS

| | | | |
|---|---|---|---|
| 2,962,594 | 11/1960 | Duffy | 250/409 |
| 3,433,954 | 3/1969 | Bowman et al. | 250/272 |
| 3,567,940 | 3/1971 | Lambert | 250/409 |
| 3,746,862 | 7/1973 | Lombardo et al. | 250/409 |
| 3,928,766 | 12/1975 | Clausen et al. | 250/272 |

OTHER PUBLICATIONS

"Designing Semiconductor System for Optimum Performance" by R. L. Heath, et al. from Nucleomics, vol. 24, No. 5, May 1966, pp. 52–56.

*Primary Examiner*—Alfred E. Smith
*Assistant Examiner*—B. C. Anderson
*Attorney, Agent, or Firm*—Arnold, White & Durkee

[57] ABSTRACT

Method and apparatus for first converting energy pulses, such as from the energy-dispersive detector of an emission spectroscopy system, into multiple ramp signals, the ramps of which are parallel with the vertical distance between the ramps being proportional to energy pulse height. Digital samples of the ramps are taken and, from the known slope of the ramps, the vertical distance or difference may be determined using a least-squares algorithm. This value is the absolute amplitude pulse value.

4 Claims, 6 Drawing Figures

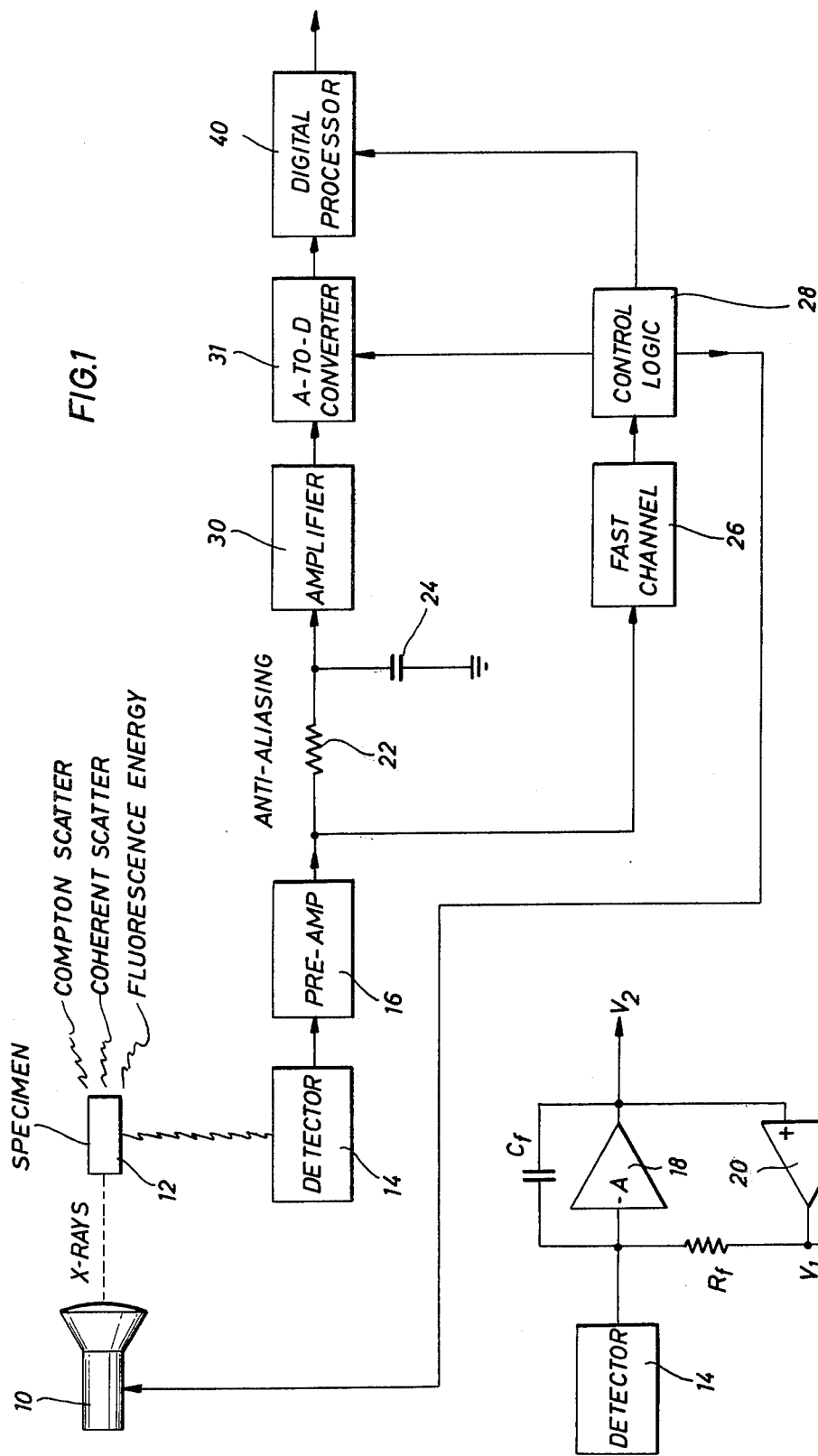

SAMPLE PULSES

FAST CHANNEL

HIGH SPEED PULSE PROCESSING

This application is a continuation-in-part of co-pending patent application Ser. No. 386,100, filed Aug. 6, 1973 of the same inventors U.S. Pat. No. 3,928,766.

BACKGROUND OF THE INVENTION

1. Field of the Invention

This invention relates to fast electronic pulse processing, particularly in the context of pulsed X-ray fluorescence analysis using an energy-dispersive detector.

2. Description of the Prior Art

A major use of electronic pulse amplifiers is to amplify very small charge or voltage pulses from radiation detectors to a level where they may be processed to provide the required measurement data. The useful information in a pulse is usually contained in its amplitude and in its frequency (if periodic) or rate of arrival (if aperiodic). Random noise is always present. In one class of instruments (X-ray, gamma-ray and nuclear spectrometers, which may be generically referred to as emission spectroscopy systems), the rate of arrival of signal pulses can be high (for example, $10^4$ to $10^6$ pulses per second) and is usually random. The pulses have different heights and the output of the instrument is a histogram of the number of pulses in a given height interval against pulse height. The resolution of the detector (e.g., a solid-state detector) used in such a system can be such that the width of a useful pulse height interval must be less than 0.1% of the maximum pulse height being processed.

The conventional electronic techniques for amplifying these pulses with respect to detector speed have been painfully slow and far below the capacity of certain types of detectors (e.g., a solid-state detector) to produce meaningful energy charges. Attempts to speed up such amplification have resulted in distorting the pulses significantly with respect to detector resolution. Present solid-state radiation detectors have nanosecond response times. State-of-the-art filtering systems for analyzing charges develop analog pulses having durations on the order of 60–70 microseconds. Faster filtering is not possible without introducing significant noise. The dead time existing in this pulse period is the major limiting factor in the processing of pulses in the solid-state radiation spectrometer and such period cannot be materially reduced even with the best possible analog filter. Hence, a fundamentally new approach to treating pulses is needed to improve the operating speed. The theory, to be hereinafter explained more fully, does away with attempting to improve the filtering of an analog pulse. Instead, the theory provides for deducing the peak value from certain sampled data leading up to the peak and additional sampled data following the peak, all of which is treated digitally, thereby avoiding having to use an analog filter.

Therefore, it is a feature of this invention to provide an improved method of processing charges resulting from an energy-dispersive, solid-state detector used in an emission spectroscopy system so that the operating speed is superior to that achievable by analog filtering for the same resolution.

It is still another feature of this invention to provide an improved system of processing rapidly occurring pulses in the context of an energy-dispersive, solid-state detector by using a source controlled by the detector electronics to essentially eliminate the "dead-time" portion of the pulse periods.

It is yet another feature of this invention to provide an improved system of processing rapidly occurring pulses in the context of an energy-dispersive, solid-state detector by using a pulsed source whose switch-on and switch-off times are controlled by the detector electronics to essentially eliminate the dead-time portion of the periods of the pulses being processed.

SUMMARY OF THE INVENTION

A preferred embodiment of the present invention includes, in an X-ray fluorescence spectroscopy apparatus or other emission spectroscopy system wherein a specimen under analysis is illuminated by a pulsable source capable of exciting characteristic X-rays, an energy-dispersive detector for receiving the photon emissions from a sample under analysis. A preamplifier is connected to the detector for producing sawtooth voltage pulses proportional to the detector charges. The ramp portions of these pulses are essentially parallel. A dc coupled amplifier amplifies the sawtooth signals to a measurable level which are then supplied to an ADC network. Here, the sawtooth ramp portions are sampled at a clock rate to produce digital values at a plurality of points along the ramp, thereby defining a ramp in digital form. The digital format of at least one of two adjacent ramps is projected in time so that the vertical distance therebetween is determinable. This value is a measure of the amplitude of a pulse and hence the value of a point useful with a plurality of subsequent pulse value points in the development of an energy histogram. Such a histogram provides the means for determining the constituent parts of the irradiated sample in a manner well-known in the art. However, new is the development of the pulse value in the above manner and its processing to permit more rapid development of the histogram points than ever before, thus minimizing dead-time losses, without sacrificing resolution, and avoiding having to correct for baseline drift.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the appended drawings illustrate only a typical embodiment of the invention and are therefore not to be considered limiting of its scope, for the invention may admit to other equally effective embodiments.

In the Drawings

FIG. 1 is a block diagram of a preferred embodiment of a system operating in accordance with the present invention.

FIG. 2 is a simplified schematic of a preamplifier suitable for operation in the system disclosed in FIG. 1.

DESCRIPTION OF PREFERRED EMBODIMENT

A new method of signal processing is required over the prior art in order to overcome the signal processing problems attendant in the prior art methods. The signal to be amplified may be thought of as the sum of random noise $E(t)$ and the information signal $v(t)$. The information signal is further assumed to be the produce of a constant-amplitude periodic function $v_u(t)$ and an amplitude modulating function $a(t)$ where $0 \leq a \leq 1$. Hence, the method disclosed herein may be thought of as a method of processing $V(t) = v(t) + E(t) = v_u(t)\cdot a(t) + E(t)$ much more rapidly than before possible and hence to obtain an accurate measure of $a(t)$ for each pulse.

Certain limits may be placed on $v_u(t)$ and $a(t)$ to agree with the waveshapes as they appear in the embodiment of the invention hereinafter disclosed. For this discussion, refer to FIG. 4. First, $v_u(t)$ is assumed to be a sawtooth or triangular function. Second, $a(t)$ is assumed to be constant for any given value from one period of $v_u(t)$ to the next. Hence, $a(t)$ is assumed only to affect the "height" of the triangular pulse and not its slope, which remains constant. Thus, it may be seen from observing the waveshape of $v(t)$ that all of the information in the pulse is contained in its relative height.

Figure 5:
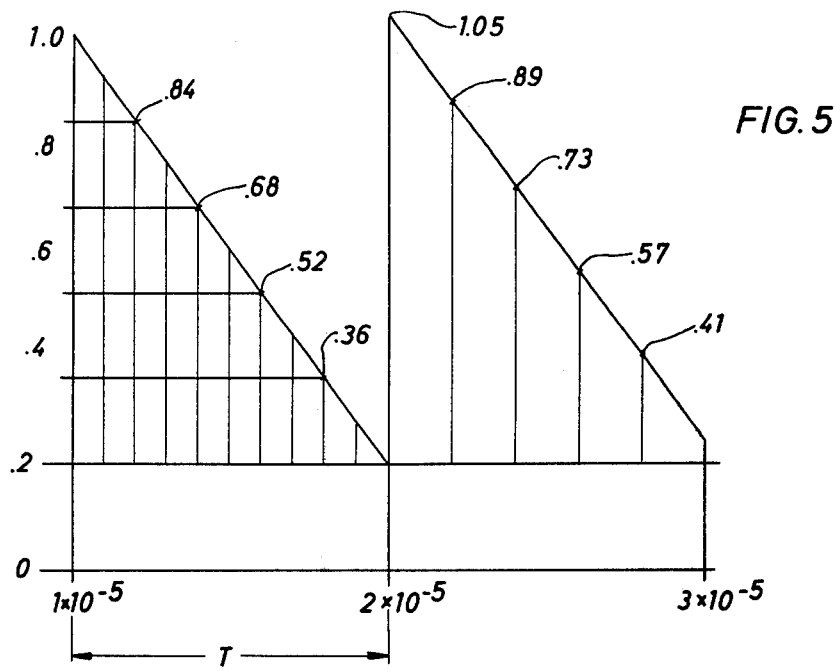
FIG. 5 is an expanded version of one of the waveshapes shown in FIG. 4, for detail analysis.

The determination of the height of a pulse of $V(t)$ may be understood with reference to FIG. 5. The pulse has a period T and is sampled N times per pulse.

From the time and amplitude sample pairs, a line of best fit using the standard least squares method is obtained. To measure the maximum height of $V(t)$ at time $1 \times 10^-$ sec, called $V'(t)$, the following expression applies: $V'(t) = A + B(t - \bar{T})$, where B is the known slope;

$$A = \frac{1}{N} \Sigma V_i,$$

$\bar{T}$ = average time over which the samples are taken. In terms of FIG. 5 values, for example, $A = \frac{1}{4}(0.84 + 0.68 + 0.52 + 0.36) = 0.6$.

B is known to be equal to $0.8/1 \times 10^{-5}$. The value of $(t-\bar{T})$ equals $0.5 \times 10^{-5}$. Hence, $$V'(t) = .6 + \left( \frac{.8}{1 \times 10^{-5}} \right) $$

$(0.5 \times 10^{-5}) = 1.0$. The minimum point at time $2 \times 10^{-5}$ may be calculated from the expression $V'(t) = A + B(\bar{T}-t)$. A similar substitution of numbers shows that the amplitude of this value is equal to 0.2. For the next pulse, the maximum height of $V(t)$ at $2 \times 10^{-5}$ may be similarly calculated to be 1.05. Then, the height of the difference, the value of $a(t)$, is equal to $1.05 - 0.02$ or 0.85.

Since the slope and period are known, $E(t)$ will only enter the calculation through A. Since the average value is equal to zero (noise being normally randomly distributed), it may be shown that for uncorrelated noise the variance in the calculated height is inversely proportional to the number of samples. Hence, although it is possible to theoretically obtain results as above with only one sample per line, it is necessary to take several to minimize the noise variance influence.

Figure 4:
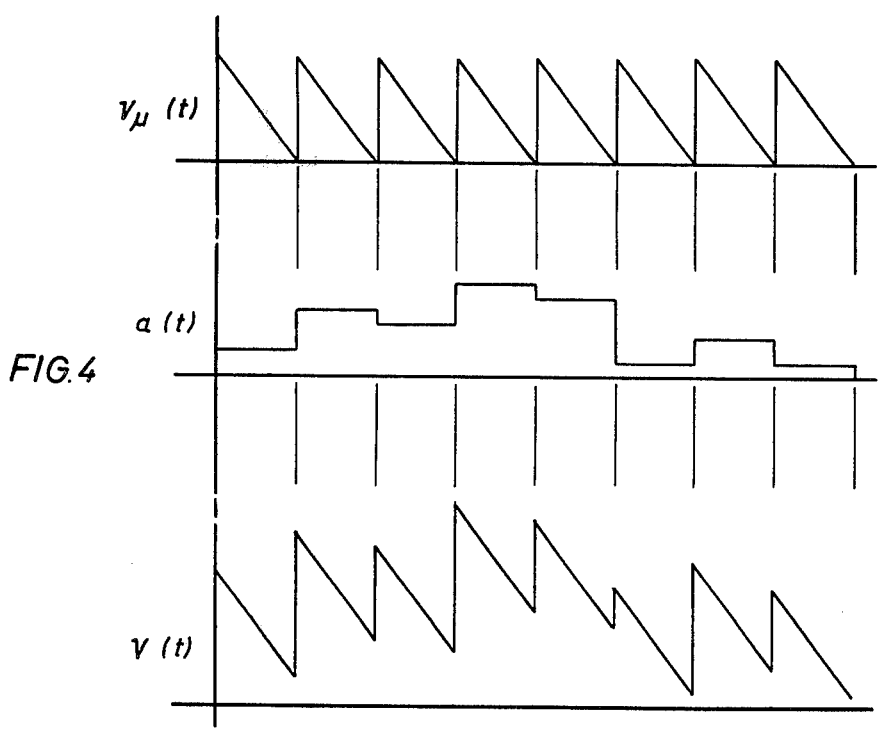
FIG. 4 are theoretical waveshapes useful in explaining the theory of operation for the present invention.

The above description will be helpful in understanding the method used in the description of the overall system, since the signal which is operated on has a waveform that closely resembles that which is shown in FIGS. 4 and 5.

Now referring to FIG. 1, a block diagram is shown of an X-ray fluorescene spectroscopy apparatus, typical of an emission spectroscopy system. Although an X-ray fluorescence system is described in the preferred embodiment, the method of determining relative amplitude value between a first linear waveform and a later occurring parallel second linear waveform has widespread application for detectors in other emission spectroscopy systems and otherwise. An X-ray source in FIG. 1 is suitably positioned for bombarding a sample or specimen 12 material under examination with low energy photons to ionize the constituent atoms of the sample. Not uncommonly, a physical arrangement includes a secondary target interposed between the X-ray source proper and the sample, but such arrangement is not required and is not illustrated. Typically, the bombardment of the sample is at a rate in excess of $10^{10}$ photons per second, and not atypically on the order of $10^{13}$ photons per second.

Sample 12 may take various forms, but it is commonly a thin deposit of material under analysis prepared on a clean filter disk. Sample preparation and the physical set-up of typical X-ray fluorescence apparatus is described, for instance, in *Energy Dispersion X-Ray Analysis: X-Ray and Electron Probe Analysis*, Special Publication STP 485, American Society for Testing and Materials, Philadelphia, 1971 and "The Si(Li) X-Ray Energy Analysis System: Operating Principles and Performance", D. A. Gedcke, *X-Ray Spectrometry*, Vol. 1, page 129, 1972, which is incorporated herein by reference.

As explained in the latter article, the advent and refinement of the Si(Li-drifted) or Si(Li) detector diode as a detector for X-Ray spectroscopy has spawned a new generation of fluorescence analyzers. The Si(Li) detector may be described as an energy-dispersive detector that converts X-ray photon energy to an electrical charge.

In simple terms, when sample 12 is irradiated or bombarded with X-rays from the source, excitation in the sample varies according to its constituent parts. Hence, the photon emission from the sample to the detector includes photon energies statistically dependent on the quantity of the constituents in the sample. That is, each time the sample is irradiated, an interaction occurs within the Si(Li) detector that produces an ionization cloud, which is swept from the detector by a bias voltage, in the form of a charge. Over a period of time, these charges, each being referred to as a charge event or merely as an event, will be at various levels and, as will be hereafter explained, can be electronically treated to form a histogram of the number of X-rays detected versus energy. From this histogram, constituent makeup of the sample can be determined.

One of the principal advantages of the Si(Li) energy-dispersive spectrometer over the wavelength spectrometer is that quick and simultaneous analysis of all elements with atomic numbers equal to or greater than 11 may be obtained.

Among the many other advantages of the energy-dispersive system using the Si(Li) detectors, besides its main ability to analyze the nearly entire spectrum at once, is its high detection efficiency, its compactness, its excellent stability (no moving parts), and the absence of an optical focusing requirement. Although the prior art Si(Li) detectors have opened up a new generation of X-ray fluorescene apparatus, amplifier circuits used heretofore to filter and shape the basic charge have introduced dead time periods of relatively long duration compared with the time for a charge to be converted to a peak voltage value (and hence to a potentially detectable and measurable quantity that can be electronically processed).

To a fully appreciate the limitations in the prior art apparatus, a fuller explanation of such apparatus is in order. In such a prior art system, the charge from the detector is applied to a charge-sensitive preamplifier that produces an output voltage pulse having an amplitude proportional to the X-ray energy. Even the most sophisticated preamplifiers add noise, one of the limiting factors in the system.

The signal is coupled to a filter-amplifier to amplify the preamplifier output signal to a measurable level for a multi-channel pulse height analyzer. The amplifier includes shaping circuits to filter the pulse signal into a near Gaussian signal, which is peak detected in an analog-to-digital converter (ADC) and then converted into a number proportional to the peak amplitude of the amplifier's output signal. This measurement is repeated on a pulse-by-pulse basis to build up the energy spectrum as a histogram.

During the time the amplifier is filtering a signal the system undergoes dead time, since there is no way of accommodating another information charge from the detector. These dead-time loss periods are long and many more charges are not used compared with those that are used for information processing. For example, it takes about 10 microseconds for a typical CR-RC filtering network to respond to a charge and produce a peak voltage output that is proportional thereto. If this value is $\tau$, the time constant for a CR-RC filter, the overall time for the value to return to 0.1% of its peak value (near zero) is typically about 115 microseconds, or the overall base-to-base time for the pulse is about 12.5 $\tau$. Even for the most sophisticated multi-stage filters including multiple stages of integrators, the filtering time is still 50–60 microseconds.

In the system described herein, a pulsed source is employed. With a pulsed source, the concept of "dead time" is changed. As such, there is no dead time in the conventional sense. There is, however, a pulse processing time which establishes the upper limit for the speed of pulse processing. As will be hereafter shown, this new concept in pulse processing achieves a substantial improvement over the conventional system of pulse handling. Typically, the rate of detection is $10^4$ to $10^6$ pulses per second, and hence the rate of processing is accomplished at this same rate. Because the filtering time for the most sophisticated prior art cannot exceed 50 microseconds without losing information for intervening charges and without sacrificing detector resolution, there is a substantial improvement for the present system for operation of the energy-dispersive detector at a rate in excess of 20,000 pulses per second, an operation not obtainable with prior art structures. Further, the method of pulse-height measuring also minimizes the limiting effects of noise insertion by the preamplifier.

Now returning to FIG. 1, the charges from specimen 12 are received by detector 14, as with prior art systems. The output of the detector is, in turn, electrically connected to charge-sensitive preamplifier 16.

Prior art preamplifiers may be thought of as merely including an operational amplifier having a parallel RC circuit connecting its output and input. Although this type of preamplifier successfully performed the required intergration step, the RC circuit establishing the time constant for the operation, such a circuit also causes an undesirable dc build-up at the output at a high pulse rate that results in the preamplifier operating in a non-linear region.

Referring to FIG. 2, a block diagram of a preamplifier circuit in accordance with the present invention is shown that uses a long time constant network, but which minimizes dc build-up. An operational amplifier 18 is connected in the conventional manner, with capacitor $C_f$ connected from its output to input. An amplifier 20 is connected in series with resistor $R_f$, the series combination connecting the output of operational amplifier 18 with its input. The ac component of the output is equal to $q_s/C_f$, $q_s$ being charge released by solid-state detector 14 for a given interaction. The value of $C_fR_f$ determines the slope of the output. Although a dc voltage tends to build up at point $V_1$ equal to $R_fI_s$, where $I_s$ is the average input signal current, the voltage no longer affects system performance since amplifier 18 only handles the ac part of the pulse. The time constant of $C_fR_f$ may be made quite large, to make the output at $V_2$ virtually linear in the region where it is important for processing purposes. This produces a sawtooth or triangular waveform with nearly straight-line decay sloping sides. The output pulse height $V_2$ is proportional to the charge delivered to the input from the detector.

Returning to FIG. 1, the output of the preamplifier is applied to an anti-aliasing or low-pass filter comprising inline resistor 22 and capacitor 24 to ground. The anti-aliasing filter removes the high frequency components that would otherwise interfere in the results of digital processing. The filtering bandwidth is set for about half the sampling frequency. The preamplifier output is also applied to fast channel circuit 26, which produces a trigger signal to control logic circuit 28 each time it detects an output event from preamplifier 16. The purpose of the development of this triggering signal will be hereafter explained.

The sawtooth signal from the preamplifier is supplied through the anti-aliasing circuit to dc amplifier 30. This amplifier the preamplifier signal to a measurable level. The output from amplifier 30 is supplied to analog-to-digital converter (ADC) 31. The technique of measuring the amplitude of this signal may best be understood by referring to FIG. 3.

Figure 3:
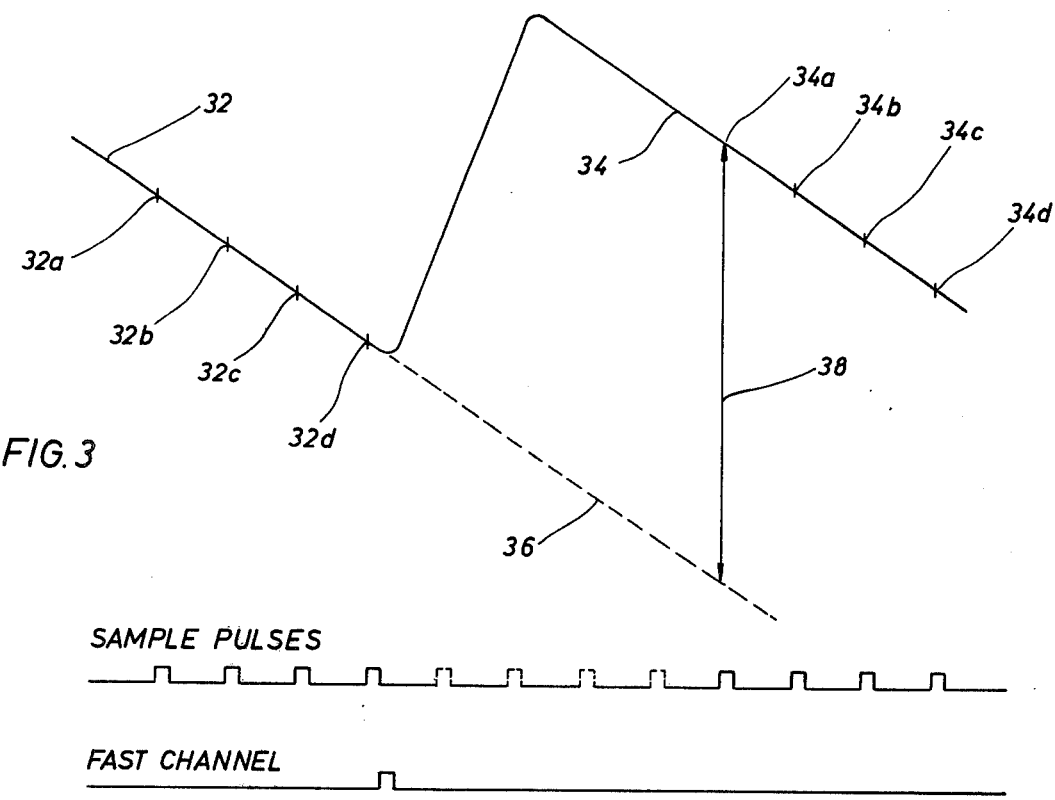
FIG. 3 is a sample waveform developed in the embodiment of the invention shown in FIG. 1 and a timing diagram with respect to operational pulses.

FIG. 3 shows an expanded representation of a typical pulse sequence from amplifier 30 as supplied to ADC 31. Because of the large time constant value of the components in the preamplifier, the output resulting from the detected charge is a virtually linear voltage ramp. 32. Ramp 32 is sampled at a plurality of points 32a, 32b, 32c and 32d, the sampling times being determined by clock pulses occurring at regular intervals. The generation and use of clock pulses is well known in the art. After a predetermined number of samples have been taken (in the example illustrated, four samples are taken), a trigger pulse is produced that causes X-ray source 10 to generate another X-ray from the sample or specimen 12, which, in turn, results in a voltage from the preamplifier. The rise time for this voltage output is a function of the collection time for the energy charge to accumulate, which, in turn, is a function of the solid state properties of the silicon in the Si(Li) detector.

The maximum or peak output from the preamplifier is not sensed, but it is known that after a predetermined period of time the output will again be producing a decaying ramp voltage 34. Again, as with ramp voltage 32, ramp voltage 34 is sampled at a plurality of points 34a, 34b, 34c and 34d at regular intervals determined by the clock pulses. Notice that these sample pulses have been suspended for a predetermined number of pulses before sampling is resumed, the amount of suspended sampling time for illustration purposes being sufficient to accommodate four pulses. The time between suspension of sampling and resumption must be sufficient to ensure that the output of preamplifier 16 is producing ramp 34 and is not on the rise portion between ramps. Also, notice that ramps 32 and 34 are substantially parallel.

A measure of the pulse amplitude is vertical distance 38 between parallel ramp 32 (or more accurately, its straight line extension 36) and ramp 34. Actually, since rams 32 and 34 do not occur simultaneously in time, it is necessary to project the value of extension 36 from sampled values 32a, 32b, 32c, and 32d. Therefore, when value 34a is determined, difference value or vertical distance 38 may be determined.

Again referring to FIG. 1, the clock pulse generator and the logic circuitry for producing the sample pulses are included in control logic circuit 28. Control logic circuit receives an input from fast channel circuit 26 and produces outputs to X-ray source 10, ADC 31, and digital processor 40.

Initially, there is an output from control logic circuit 28 to turn on X-ray source 10. This pulse to source 10 may be assumed to occur at the same time as the last of the sample pulses in a sampling series supplied to ADC 31. There is then a suspension of an output from control logic circuit 28 to ADC 31 for the number of counts included in the suspension period between the sampling series. Then, sampling pulses are again produced to ADC 31.

There is an output triggering pulse produced from fast channel circuit 26 each time this circuit detects an event from preamplifier 16. It may be recalled that when preamplifier receives a charge from detector 14, it produces an output which is the eventual subject of analysis. But, this output is also useful as an initiating signal to fast channel circuit 26, the output of which is supplied for convenience through control logic circuit 28 to shut off X-ray source 10. It is immaterial that the energy level differs from pulse to pulse or that at this point the preamplifier output has not been filtered. What is important it its existence, which is all that is required to produce an output triggering pulse from the fast channel circuit. Hence, only one charge at a time is produced for analysis. X-ray source 10 is held off until the next initiating signal from control logic 28.

Although what has been described above is absolutely controlled by the clock pulse rate, it is alternatively possible to initiate each suspension and sampling series with the output from fast channel circuit 26. When this is done, then the time between the last pulse in the sampling series and the fast channel pulse (see FIG. 3) has to be measured since this time enters into the calculated projected value of extension 36.

The network in ADC 31 which is primarily instrumental in converting the analog signal occuring at the time of sampling to a digital value is referred to as a sample-and-hold network. Actually, this circuit, well-known in the art, follows or tracks an analog voltage and at each sampling occurrence produces a dc output at the current analog level. This output persists from the network until the next sampling occurrence. Hence, the analog signal is converted to a stair-step signal, or a purality of successive dc voltage values. It is again well-known how to convert a dc voltage to a digital count. A 12-bit output results in the capability of producing well over 1000 different channels for the histogram. Notice that such range is possible even though there are very few samples taken. Hence, the processing time may be kept quite short compared with prior art peak detector processing systems and the like. In truth, the analog signal is converted to a digital format, which can be rapidly manipulated by well-known digital circuits. Thus, stretching the art of analog processing is avoided altogether.

The operation of digital processor 40 may be best understood by first understanding the development of the operating algorithm. The problem is to develop the value of vertical distance 38. For convenience, this quantity may be designated Y, the incremental points on ramp 34 where the measurements are taken may be designated $Y_{2i}$ and the incremental points on the previous ramp 32 where the measurements are taken may be designated $Y_{1i}$. The formula for the difference in Y values, in general terms, may be shown to be as follows: $Y_2 - Y_1 = (a_2 - a_1) + b(\bar{x}_1 - \bar{x}_2)$, wherein $$a_1 = \frac{1}{N} \Sigma Y_{1i}, a_2 = \frac{1}{N} \Sigma Y_{2i},$$

$b = $ slope and $\bar{x}_1$ and $\bar{x}_2$ are the average time values to which $Y_2$ and $Y_1$ respectively pertain. Since slope, and $\bar{x}_1 - \bar{x}_2$ can be assumed to be constant, the formula reduces to the following:

$$Y_2 - Y_1 = \frac{1}{N} \Sigma (Y_{2i} - Y_{1i}) + K.$$

It is this formula which is acted on by digital processor 40.

Figure 6:
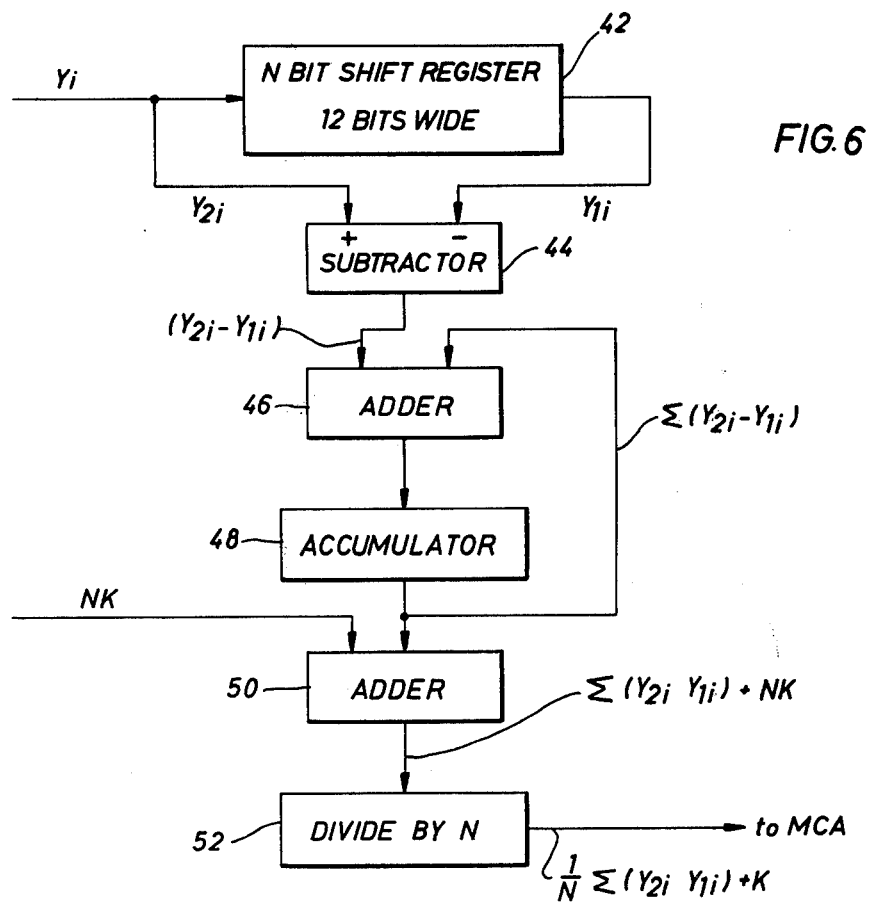
FIG. 6 is a simplified block diagram of the digital processor used in a preferred embodiment of the present invention.

An expanded simplified block diagram of an embodiment of digital processor 40 is shown in FIG. 6. The incremental $Y_i$ values are supplied to N bit shift register 42. At first these are the incremental values along ramp 32 and then they are, after the suspension period, the incremental values along ramp 34. The logic circuitry for stepping down the values along ramp extension 36 is included in the register.

The output and the input to register 42 are supplied to subtractor 44, where the incremental difference values are developed. The output of subtactor 44 is supplied to adder 46, which supplies its output to accumulator 48. The output of accumulator 48 is supplied as another input to adder 46, so that the output from the accumulator is a summation of the incremental vertical differences. The accumulator is connected to another adder 50, to which is also supplied the constant K information multiplied by the number in the sampling series. In the example illustrated, this number is 4. Finally, adder 50 supplies its output to divide-by-N circuit 52 to produce the output or vertical distance 38 (value Y) to the multi-channel analyzer where the histogram is developed in a manner well-known in the art.

For simplicity, reset connections and clock pulse connections are not shown in FIG. 6. Operation is successive only for the number of sampling pulses and is suspended during the suspension period between sampling series. Conventional gating circuits may be used for this purpose.

The development of the slope information may be achieved in various ways. A separate run for each particular specimen may be made over several events, the slope being determined from the measured points. The slope is a function of count rate and not just the values of $C_fR_f$, and therefore must be separately determined for each specimen. Then, for this particular specimen, the value may be supplied as a function of the NK input to adder 50. Alternatively, it can be developed directly from the $V_1$ value of the preamplifier shown in FIG. 2 via sample-and-hold and ADC circuits not shown, but which are similar to those used in ADC 31. The value N for the number of samples in a series must also be supplied.

It is well-known that for several reasons, a very large number of points have to be plotted to make a reliable histogram. The large number of channels of energy level separation (typically, 1024) means that it takes awhile for a number of points in each channel to be developed. About a minimum of 300 points is necessary before the data is considered valid. Further, many more points are collected in the coherent and Compton backscatter regions than in the fluorescence energy regions where meaningful analysis can be performed. Still further, each peak is represented by at least 5–10 channels, again requiring a very large number of data points. The saving in time of the system just described over the prior art, wherein detection of photons from the sample is at a rate in excess of 20,000 pulses per second, obtains a nominal 1 million data points for the histogram through the elimination of the dead time losses previously existing and is hence one of the great advances of the present system over the prior art.

While a particular embodiment of the invention has been shown, it will be understood that the invention is not limited thereto, since many modifications may be made and will become apparent to those skilled in the art.

What is claimed is:

1. Method of processing energy charges from an energy-dispersive detector to determine the amplitude values of said charges, the detector operating in an emission spectroscopy system wherein a specimen under analysis is illuminated by a pulsable source capable of exciting characteristic X-rays, which comprises:
   detecting a first energy charge with a long time constant circuit, the output therefrom being a first substantially linear decay;
   sampling the amplitude value of said first linear decay and converting said sample value to digital form;
   determining the slope of said first linear decay;
   creating a second energy charge for detection by the detector by pulsing on said source, the output from the detector being a second substantially linear decay;
   at a measurable time thereafter, sampling the amplitude value of said second linear decay and converting said sampled value to digital form;
   digitally projecting along the slope of said first linear decay the amplitude value at the time of the sampling of said second linear decay; and
   subtracting the value of said projected first linear decay from said sampled second linear decay to determine the relative amplitude value of said first and second decays.

2. The method as set forth in claim 1, including sampling said first and second linear decays at a predetermined plurality of points so as to develop a plurality of relative amplitude values of said first and second charges, and the additional step of determining the average relative amplitude value of said plurality of relative amplitude values of said first and second charges.

3. Method of processing energy charges from an energy-dispersive detector to determine the amplitude values of said charges, the detector operating in an emission spectroscopy system wherein a specimen under analysis is illuminated by a pulsable source capable of exciting characteristic X-rays, which comprises:
   detecting a first energy charge with a long time constant circuit, the output therefrom being a first substantially linear decay;
   sampling the amplitude value of said first linear decay and converting said sample value to digital form;
   creating a second energy charge for detection by the detector by pulsing on said source, the output from the detector being a second substantially linear decay;
   at a measurable time thereafter, sampling the amplitude value of said second linear decay and converting said sampled value to digital form;
   determining the slope of at least one of said first and second linear decays;
   digitally projecting along said determined slope one of said first and second linear decays to determine the amplitude value thereof at the time of the non-projected other of said first and second linear decays; and
   subtracting the value of said projected from said non-projected decay to determine the relative amplitude value of said first and second decays.

4. X-ray fluorenscence spectroscopy apparatus, comprising:
   an X-ray excitation source for bombarding a sample to cause photon emission of electromagnetic radiation characteristic of the constituent elements of the sample;
   an energy dispersive detector for detecting the photons from the sample at a rate in excess of 20,000 pulses per second, said detector establishing charges proportional to the energy of successively detected X-ray photons;
   processing means connected to said detector for converting said successive charges to pulses and determining the heights thereof without losing information for intervening charges and without sacrificing detector resolution; and
   means operated by said charges from said detector for controlling the operating times of said X-ray excitation source.

\* \* \* \* \*

UNITED STATES PATENT OFFICE
CERTIFICATE OF CORRECTION

Patent No. 4,021,667              Dated May 3, 1977

Inventor(s) Kermit D. Clausen and John R. Rhodes

It is certified that error appears in the above-identified patent and that said Letters Patent are hereby corrected as shown below:

Col. 3, line 11, "produce" should be -- product --; lines 15 and 16, "$V(t) = v(t) + E(t) = v_u(t-) \cdot a(t) + E(t)$" should be --$V(t) = v(t) + E(t) = v_u(t) + \cdot a(t) + E(t)$--; line 37, "$1 \times 10^-$" should be --$1 \times 10^{-5}$--.

Col. 4, line 10, "fluorescene" should be --flourescence--; line 17, after "source" should be inserted --10--.

Col. 5, line 8, "fluorescene" should be --fluorescence--; line 15, "a" should be --more--.

Col. 6, line 25, after "being" should be inserted --the--; line 53, "amplifier" should be --amplifies--.

Col. 7, line 7, after "Si(Li)" should be inserted --diode-- line 27, "rams" should be --ramps--; line 58, "it" should be --is--.

Col. 8, line 32, "$Y_{1i}$" should be --$Y_{1i}$--; line 37, "$a_i$" should be --$a_1$--.

Col. 10, line 16, "of" should be --from--; line 45, after "projected" should be inserted --decay--.

Signed and Sealed this

Twentieth Day of September 197

[SEAL]

Attest:

RUTH C. MASON
*Attesting Officer*

LUTRELLE F. PARKER
*Acting Commissioner of Patents and Trademark*